US012473746B1

(12) United States Patent
Zhang

(10) Patent No.: US 12,473,746 B1
(45) Date of Patent: Nov. 18, 2025

(54) ADJUSTABLE DOOR LATCH

(71) Applicant: Tao Zhang, Guangzhou (CN)

(72) Inventor: Tao Zhang, Guangzhou (CN)

( * ) Notice: Subject to any disclaimer, the term of this patent is extended or adjusted under 35 U.S.C. 154(b) by 0 days.

(21) Appl. No.: 19/267,776

(22) Filed: Jul. 14, 2025

(30) Foreign Application Priority Data

Jun. 26, 2025 (CN) ......................... 202521333367.5

(51) Int. Cl.

*E05B 15/02* (2006.01)
*E05C 17/14* (2006.01)
*E05C 17/30* (2006.01)

(52) U.S. Cl.

CPC ............ *E05B 15/024* (2013.01); *E05C 17/14* (2013.01); *E05C 17/30* (2013.01)

(58) Field of Classification Search

CPC ........ E05B 15/024; E05C 17/00; E05C 17/04; E05C 17/047; E05C 17/14; E05C 17/30; E05C 17/042; E05C 17/34; E05C 19/004
See application file for complete search history.

(56) References Cited

U.S. PATENT DOCUMENTS 163,621 A * 5/1875 Zimmerman ........... E05C 17/14 232/1 R
769,209 A * 9/1904 Lan ......................... E05C 17/30 292/DIG. 20
913,291 A * 2/1909 Hillyard et al. ......... E05C 17/30 292/DIG. 20
979,138 A * 12/1910 Ericson ................... E05C 17/30 292/268
1,000,006 A * 8/1911 Jackson .................. E05C 17/04 229/125.23
1,216,968 A * 2/1917 Ebert ...................... E05C 17/14 292/271
2,140,849 A * 12/1938 Opland ................... E05C 17/14 49/67
2,374,426 A * 4/1945 Diederich ............... E05C 17/14 217/60 B
2,434,598 A * 1/1948 Stegall .................... E05C 17/30 292/262

(Continued)

OTHER PUBLICATIONS

Amazon Website, lasuroa Floating Boats, Eariest Comment Date: Jan. 21, 2025 [Website Visited Jan. 21, 2025] Available on the Internet URL https://www.amazon.com/dp/B0DTJYQZ28 ( Year: 2025 ).

*Primary Examiner* — Christine M Mills
*Assistant Examiner* — Faria F Ahmad
(74) *Attorney, Agent, or Firm* — Birchwood IP

(57) ABSTRACT

An adjustable door latch is provided, which includes a base part, one side of the base part is provided with a clamping part. A ventilation groove is provided in a middle of the base part, a positioning hole is provided on the ventilation groove. A rebound pin is provided on the base part, a movable lock tongue is provided in the ventilation groove. The movable lock tongue is provided with spaced adjustment holes, and a bottom end of the rebound pin penetrates the positioning hole and is plugged into the adjustment hole. The adjustment holes are matched with the positioning holes on the ventilation groove, and the rebound pin is used to achieve telescopic positioning. The size of the ventilation opening can be flexibly adjusted according to thickness of the vehicle door and the distance between the door locks of different vehicle models adjustable door latch.

6 Claims, 4 Drawing Sheets

(56) References Cited

U.S. PATENT DOCUMENTS

| | | | | | |
|---|---|---|---|---|---|
| 2,724,609 | A * | 11/1955 | Donnelly | E05C 17/30 | 292/266 |
| 3,117,689 | A * | 1/1964 | Dedic, Sr. | E05C 17/042 | 292/DIG. 43 |
| 3,583,743 | A * | 6/1971 | Newell | E05C 19/004 | 292/288 |
| 4,070,050 | A * | 1/1978 | Glock | E05C 21/005 | 292/339 |
| 4,176,870 | A * | 12/1979 | Cracraft | E05C 19/004 | 292/338 |
| 4,278,280 | A * | 7/1981 | Rashbaum | E05C 17/042 | 292/338 |
| 4,478,168 | A * | 10/1984 | Wimmer | E05C 19/004 | 116/DIG. 44 |
| 4,483,558 | A * | 11/1984 | Van Meter | E05C 19/004 | 292/339 |
| 4,593,946 | A * | 6/1986 | Rich | E05C 21/005 | 292/288 |
| 5,366,313 | A * | 11/1994 | LaBarre | E05C 17/30 | 403/322.2 |
| 6,029,941 | A * | 2/2000 | Mayzes | E05C 17/042 | 248/354.3 |
| 6,428,062 | B1 * | 8/2002 | Roehl | E05C 17/042 | 292/339 |
| 7,481,408 | B1 * | 1/2009 | Knight | E04G 25/06 | 248/200.1 |
| D632,946 | S * | 2/2011 | Hartgens | E05C 17/30 | D8/339 |
| 8,413,382 | B2 * | 4/2013 | Uto | E05D 11/06 | 49/381 |
| 8,899,634 | B1 * | 12/2014 | Stile | E05C 1/04 | 292/DIG. 40 |
| 10,807,693 | B2 * | 10/2020 | Harp | B64C 1/24 | |
| 11,771,245 | B1 * | 10/2023 | Kressin | A47G 1/02 | 248/475.1 |
| 2002/0158177 | A1 * | 10/2002 | Hill | E06B 7/28 | 248/161 |
| 2004/0145207 | A1 * | 7/2004 | Lisk, III | B62D 33/0273 | 296/50 |
| 2012/0279538 | A1 * | 11/2012 | Chen | E05C 19/18 | 292/289 |
| 2017/0198512 | A1 * | 7/2017 | Gramstad | E05C 9/14 | |
| 2019/0162000 | A1 * | 5/2019 | Krishnamoorthy | B62D 25/105 | |
| 2024/0026717 | A1 * | 1/2024 | Narayanappa | B64C 1/1461 | |

* cited by examiner

ADJUSTABLE DOOR LATCH

CROSS-REFERENCE TO RELATED APPLICATIONS

This application claims priority to Chinese Patent Application No. 202521333367.5, filed on Jun. 26, 2025, which is hereby incorporated by reference in its entirety.

TECHNICAL FIELD

The present disclosure relates to the field of all terrain door lock technologies, and in particular, to an adjustable door latch.

BACKGROUND

As a special type of vehicle, all-terrain vehicles often operate in harsh environments with high temperatures and dust. Their doors are usually designed to be sealed to ensure safety, but this also leads to poor ventilation and high temperatures inside the vehicle.

To solve this problem, ventilation door lock devices have emerged in the market. By adding a ventilation structure between the vehicle door and the door lock, external air can enter the vehicle through specially designed vents, thereby improving the driving environment.

However, the existing ventilation door lock device cannot adapt to the needs of different vehicle models due to its fixed ventilation opening size. For models with thicker doors, the distance between the ventilation opening and the vehicle door lock is too large, resulting in ineffective engagement of the clamping part. This not only fails to form a stable ventilation channel, but also may cause severe shaking of the ventilation door lock during driving due to an excessive installation clearance, exacerbating component wear and even detachment. For models with thinner vehicle doors, the size of the ventilation opening is too large, which can lead to insufficient adjustment range of the movable lock tongue, unable to fully close the vehicle door, damaging the airtightness of the vehicle door, rendering it easy for external debris such as dust and rain to enter the vehicle, and increasing wind noise.

Therefore, an adjustable door latch to solve the above problems is provided.

SUMMARY

The purpose of the present disclosure is to provide an adjustable door latch to solve the problems raised in the background technology mentioned above.

To solve the above technical problems, the present disclosure provides an adjustable door latch, including a base part, where a clamping part is provided on one side of the base part, a ventilation groove is provided in a middle of the base part, and a positioning hole is provided on the ventilation groove; a rebound pin is provided on the base part, and a movable lock tongue is provided inside the ventilation groove; the movable lock tongue is provided with spaced adjustment holes, and a bottom end of the rebound pin penetrates the positioning hole and is plugged into the adjustment holes.

In some embodiments of the present disclosure, the clamping part is Z-shaped, and the clamping part includes a first horizontal section, an inclined section, and a second horizontal section that are connected in sequence; an end of the second horizontal section is fixedly connected with a hook-shaped protrusion that is inwardly bent.

In some embodiments of the present disclosure, the base part is made of aluminum alloy material.

In some embodiments of the present disclosure, an axis of the base part is parallel to an axis of the movable lock tongue.

In some embodiments of the present disclosure, apertures of the adjustment hole and the positioning hole are the same, and their central axes coincide.

In some embodiments of the present disclosure, a parallel distance between the base part and the movable lock tongue is six millimeters.

In some embodiments of the present disclosure, an axis of the second horizontal section is perpendicular to an axis of the hook-shaped protrusion.

Compared with existing technologies, the beneficial effects of the present disclosure are: by providing the ventilation slots and the adjustable movable lock tongues, the adjustment holes distributed at intervals on the movable lock tongues are matched with the positioning holes on the ventilation slots, and a rebound pin is configured to achieve telescopic positioning, so that the size of the ventilation opening can be flexibly adjusted according to the thickness of different vehicle doors and the distance between door locks, solving the problem of existing ventilation door lock devices being unable to adapt to different vehicle models due to fixed size, and improving the universality and practicality of adjustable door latch.

Compared with the existing technology, the beneficial effect of the present disclosure is that a multi-angle structure is formed by sequentially connecting the first horizontal section, inclined section, and second horizontal section, which conforms to the contour of the U-shaped door lock of the vehicle body when the vehicle door is closed. Compared with the traditional flat clamping structure, it increases a contact area and clamping stability. The hook-shaped protrusion at the end of the second horizontal section that is bent inwardly can be embedded into an interior of the U-shaped vehicle lock, thereby forming a hook like embedded buckle connection. This structure can utilize the mechanical interlocking effect between the hook shaped protrusion and the U-shaped door lock to resist lateral and longitudinal displacement forces, thereby improving the connection reliability and safety of the adjustable door latch in complex road conditions.

Figure 1:
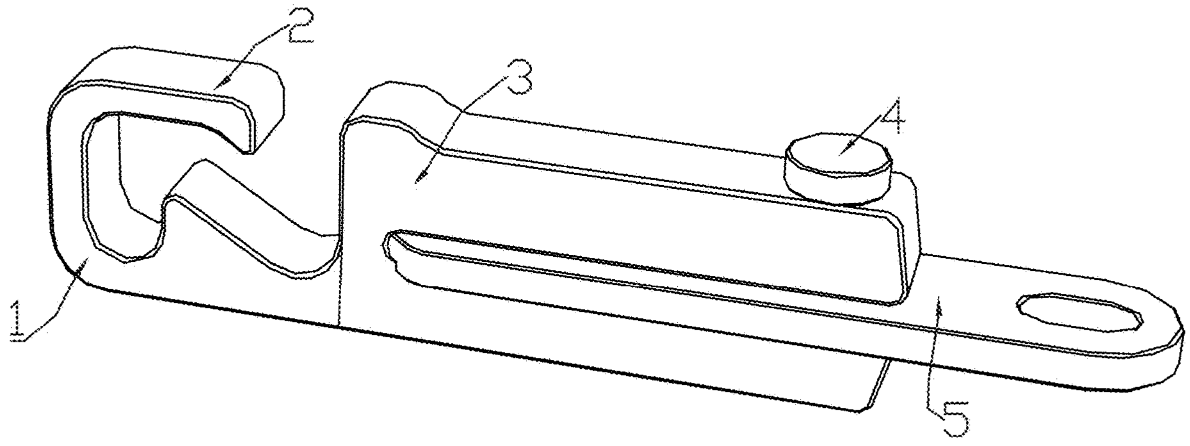
FIG. 1 is a schematic structural diagram of the present disclosure.

Numeral reference: 1—clamping part; 2—hook-shaped protrusion; 3—base part; 4—rebound pin; 5—movable lock tongue; 6—adjustment hole; 7—ventilation groove; 8—positioning hole; 9—second horizontal section; 10—inclined section; 11—first horizontal section.

DESCRIPTION OF EMBODIMENTS

The following will provide a clear and complete description of the technical solution in the embodiments of the present disclosure, based on the accompanying drawings. Obviously, the described embodiments are only a part of the embodiments of the present disclosure, not all of them. Based on the embodiments in the present disclosure, all other embodiments obtained by those skilled in the art without creative work are within the protection scope of the present disclosure.

Please refer to FIGS. 1-4. The present disclosure provides a technical solution: an adjustable door latch includes a base part 3, and the base part 3 is flat and fixedly connected to an inner wall of the vehicle door. One side of the base part 3 is integrally provided with a clamping part 1. A ventilation groove 7 is provided at a middle of the base part 3, and a positioning hole 8 is provided on the ventilation groove 7. A rebound pin 4 is provided on the base part 3, and a movable lock tongue 5 is provided in the ventilation groove 7. The movable lock tongue 5 is provided with spaced adjustment holes 6, the adjustment holes 6 cooperate with the positioning holes 8 to achieve a telescopic positioning of the movable lock tongue 5 through the rebound pin 4. A bottom end of the rebound pin 4 is penetrated the positioning hole 8 and is inserted into the adjustment hole 6.

During a specific implementation, the flat base part 3 is placed in close contact with an inner wall of the vehicle door, and the clamping part 1 is facing towards a direction of the vehicle door lock, the vehicle door is closed, and the clamping part 1 interacts with the vehicle door lock to achieve preliminary fixation. When adjusting the ventilation volume, the movable lock tongue 5 is manually pulled to slide inside the ventilation groove 7, and the adjustment holes 6 spaced apart on the movable lock tongue 5 will move accordingly. According to a required size of the ventilation opening, the movable lock tongue 5 is held in an appropriate position. At this time, the positioning hole 8 on the ventilation groove 7 of the base part 3 is aligned with one of the adjustment holes 6 of the movable lock tongue 5. The rebound pin 4 on the base part 3 automatically moves downward under an action of elastic force, and its bottom end penetrates the positioning hole 8 and is inserted into the adjustment hole 6 to fix the movable lock tongue 5. During a driving process of the vehicle, external air flows into the vehicle through the ventilation groove 7 in the middle of the base part 3, and enters the gap formed by the movable lock tongue 5 and the ventilation groove 7, thereby achieving ventilation and cooling.

Figure 2:
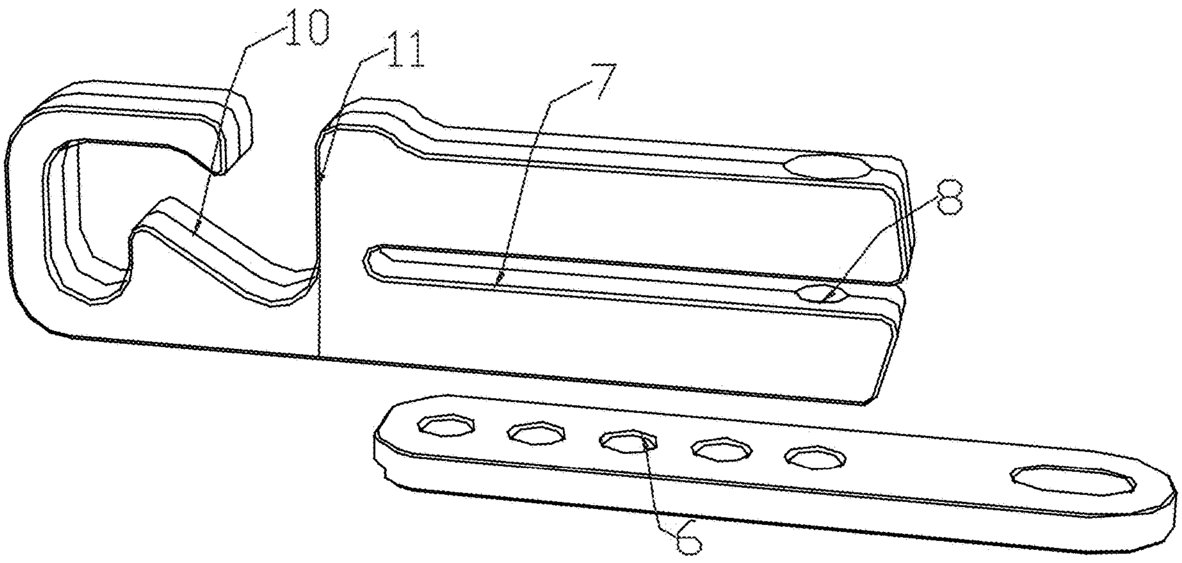
FIG. 2 is an exploded structural view of the present disclosure.
Figure 3:
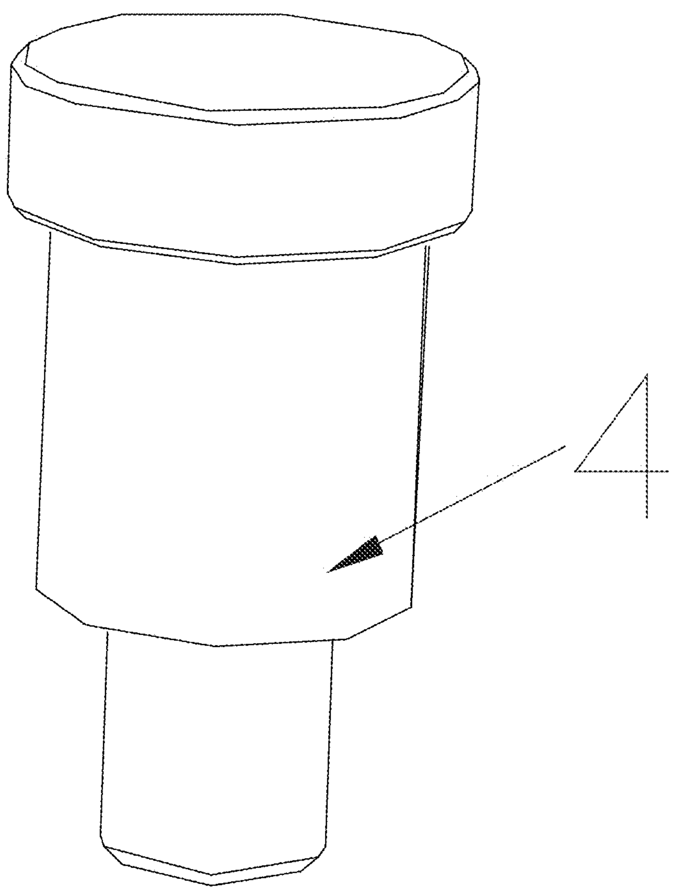
FIG. 3 is a schematic structural diagram of a rebound pin of the present disclosure.
Figure 4:
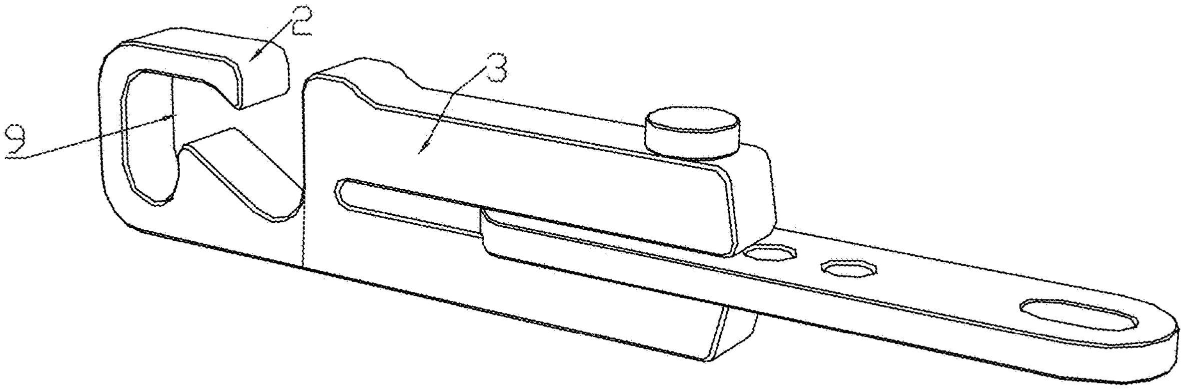
FIG. 4 shows another connection state diagram between a clamping part and a base part of the present disclosure.

Referring to FIG. 2, the clamping part 1 is Z-shaped. The clamping part 1 includes a first horizontal section 11, an inclined section 10, and a second horizontal section 9 that are sequentially connected to form a multi-angle structure. When the vehicle door is closed, it conforms to the contour of the U-shaped door lock of the vehicle body. An end of the second horizontal section 9 is fixedly connected with a hook-shaped protrusion 2 that is inwardly bent, which is embedded in an interior of the U-shaped door lock to form a stable embedded buckle connection, which prevents the door lock from loosening and falling off during vehicle driving. A parallel distance between the base part 3 and the movable lock tongue 5 is six millimeters, which reserves space for the expansion and contraction adjustment of the movable lock tongue 5. A user can increase or decrease the distance according to actual needs to control the ventilation volume and meet the ventilation needs in different scenarios.

Referring to FIG. 1, the base part 3 is made of aluminum alloy material, which has good corrosion resistance for the base part 3 and is used to resist the erosion of the base part 3 by the external environment. The aluminum alloy has high strength and can withstand the vibration and external forces during vehicle driving, rendering it less prone to deformation and damage, and extending the service life of the base part 3. An axis of the base part 3 is parallel to an axis of the movable lock tongue 5 to avoid displacement or jamming.

Referring to FIG. 2, an aperture of adjustment hole 6 is the same as that of positioning hole 8, and their central axes coincide. The movable lock tongue 5 is not easily loosened or displaced after being fixed, maintaining the stability of the ventilation opening size and ensuring the ventilation effect.

In an implementation mode, an axis of the second horizontal section 9 is perpendicular to an axis of the hook-shaped protrusion 2, which can decompose an impact force into a support force of the horizontal section and a pulling force of the hook-shaped protrusion 2, avoiding loosening caused by single point force and improving the bite strength between the clamping part 1 and the vehicle door lock.

Working principle: when in use, the base part 3 is first placed against the inner wall of the vehicle door, so that the Z-shaped structure formed by the first horizontal section 11, inclined section 10, and second horizontal section 9 of the clamping part 1 corresponds to a contour of the U-shaped door lock of the vehicle body. When the vehicle door is closed, the hook-shaped protrusion 2 at the end of the second horizontal section 9 is embedded into an interior of the U-shaped door lock, thereby completing an initial fixation of the door lock. When adjusting the ventilation volume, the movable lock tongue 5 is manually pulled to slide inside the ventilation groove 7. The adjustment hole 6 on the movable lock tongue 5 changes position along with the movement. When an appropriate ventilation hole size is selected, the rebound pin 4 is automatically popped into an aligned positioning hole 8 and the adjustment hole 6, thereby fixing the movable lock tongue 5. The aluminum alloy base part 3 maintains structural stability, and the movable lock tongue 5 and the base part 3 maintain a parallel distance of six millimeters to form a ventilation channel. The external air enters the vehicle through the gap between the ventilation groove 7 and the movable lock tongue 5.

What is claimed is:

1. An adjustable door latch, comprising a base part, wherein a clamping part is provided on one side of the base part, a ventilation groove is provided in a middle of the base part, and a positioning hole is provided on the ventilation groove;

- a rebound pin is provided on the base part, and a movable lock tongue is provided inside the ventilation groove;
- the movable lock tongue is provided with spaced adjustment holes, and a bottom end of the rebound pin penetrates the positioning hole and is plugged into the adjustment holes;
- wherein the clamping part is Z-shaped, and the clamping part comprises a first horizontal section, an inclined section, and a second horizontal section that are connected in sequence;
- an end of the second horizontal section is fixedly connected with a hook-shaped protrusion that is inwardly bent.

2. The adjustable door latch according to claim 1, wherein the base part is made of aluminum alloy material.

3. The adjustable door latch according to claim 1, wherein an axis of the base part is parallel to an axis of the movable lock tongue.

4. The adjustable door latch according to claim 1, wherein apertures of the adjustment hole and the positioning hole are the same size, and their central axes coincide.

5. The adjustable door latch according to claim 1, wherein a parallel distance between the base part and the movable lock tongue is six millimeters.

6. The adjustable door latch according to claim 1, wherein an axis of the second horizontal section is perpendicular to an axis of the hook-shaped protrusion.

* * * * *